Nov. 22, 1960
T. A. RICH
2,960,869
ARC COMPARATOR
Filed Oct. 2, 1956
2 Sheets-Sheet 1
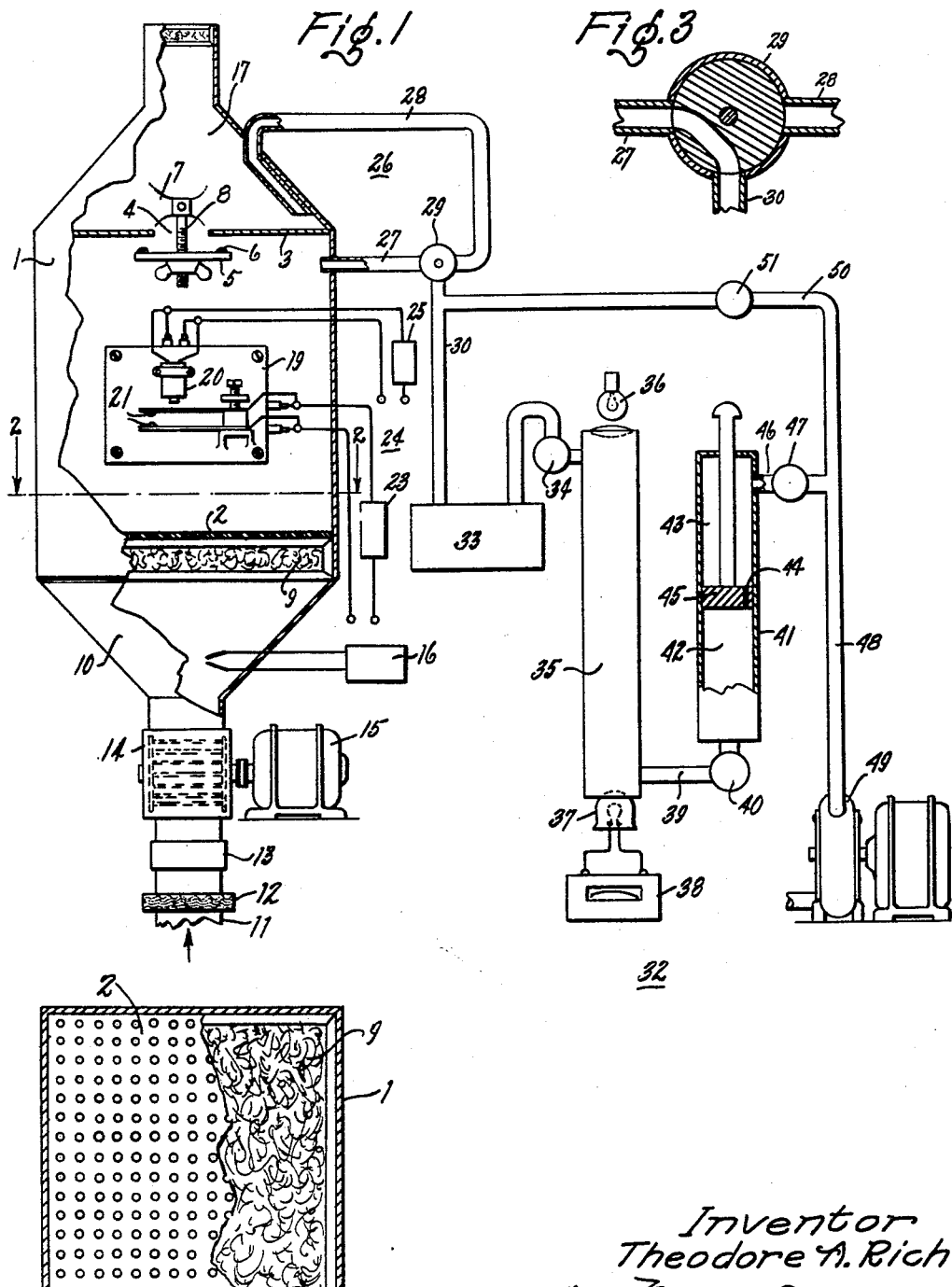
Inventor
Theodore A. Rich
by Merton D Morse
His Attorney Nov. 22, 1960 T. A. RICH 2,960,869
ARC COMPARATOR
Filed Oct. 2, 1956 2 Sheets-Sheet 2

Inventor
Theodore A. Rich
by His Attorney 2,960,869
Patented Nov. 22, 1960

2,960,869
ARC COMPARATOR

Theodore A. Rich, Schenectady, N.Y., assignor to General Electric Company, a corporation of New York Filed Oct. 2, 1956, Ser. No. 613,505

5 Claims. (Cl. 73—432)

This invention relates to a method and apparatus for determining the erosion effect of electrical arcing on contact elements. More particularly, it relates to a method and apparatus for determining the effect of arcing which utilizes condensation nuclei measuring techniques.

When an electrical arc is established by making or interrupting the flow of current between a pair of contacts, an erosion of the contact material occurs. The nature and magnitude of this arc induced erosion is of great significance inasmuch as it will determine the life of the contact elements and the frequency of replacement of the element. The effects of arcing on the useful life of a contact element is controlled by many different parameters.

Thus, among other things, the bounce characteristics of a relay vitally affect the erosion of the relay contact elements. There are many factors which affect the bounce characteristics, as for example, the mass of the contacts and the supporting arms, the natural frequency of the mechanical structure, the force, velocity, and accelerations involved in closing.

Similarly, the nature of the contact material may have a strong effect upon the amount of contact erosion produced during the arcing. Furthermore, the type of load, whether inductive or non-inductive, will to some extent determine the erosion characteristics of a particular type of contact element.

Thus, a designer of equipment such as relays, starting elements, circuit breakers, etc. must constantly keep in mind the effect of these various parameters on the erosion characteristics of the contact elements. In the past it has been customary to construct samples of various configurations and to evaluate these samples by means of life tests in order to determine the effect of the various parameters on erosion characteristics. However, this prior art method is obviously very lengthy and tedious and is, therefore, relatively unsatisfactory. Consequently, there is an urgent need for a method and apparatus which permits a rapid evaluation of the comparative amount of erosion of the contact material for various parameters such as contact material, load characteristics, mechanical configuration, velocities of openings or closings, etc.

While this method is far faster and thus more convenient and less expensive than the usual "life test" it should be noted that it is more valuable as a tool to improve relay type devices than a life test. For example, a given relay might have a life in the neighborhood of $10^7$ operations. Operated once a second it would go 116 days or roughly 4 months before wearing out in a life test. Due to minor deviations in manufacture it would not be unlikely to have apparently identical relays vary 20% in life even though made at the same time. Testing a single relay at the same time as one on which an "improvement" had been made would give inconclusive results of improvement unless the increase of the modified relay was greater than 20%. Increasing the number of relays tested would make it possible to detect a smaller improvement with a statistical certainty. Improvements in highly developed devices are not likely to come in jumps as big as 20%, instead a few percent is picked up here and there to make a significant improvement. When tests are made sequentially and the test stretched out over considerable periods there is great hazard in comparing results of life tests because of possible variations in the materials of manufacture with time or between procurements of different lots of material. In contrast with this equipment the optimum contact opening pressure, wipe, etc. can be found on the same relay, say some twenty tests in a morning. Similar sequential life tests would take 6 years.

It has been observed that during the electrical arcing phenomena an extremely high concentration of condensation nuclei is present in the vicinity of the arc. It is believed that when an electric arc is formed the extremely high temperature—above 3000° K.—present in the arc vaporizes the contact material and causes it to be diffused into the air surrounding the contact element as a gas. The gas cools rapidly and this action then results in the creation of a large number of extremely minute particles only a few angstroms in radius (1 angstrom=$10^{-8}$ cm.). The number of particles produced runs in the order of $10^{+13}$ per cubic centimeter. These particles immediately start recombining by collison. This recombination rate is extremely rapid and is a function of the square of the number of particles present and of their average kinetic energy. In only a few microseconds, the major portion of the particles have collided one or more times and recombined to form larger particles. This recombination process continues and the average particle becomes of the order of magnitude of $10^{-6}$ cm. radius. Thus, after a few milliseconds the air surrounding the contacts contain several million particles ranging in size from $10^{-8}$ to $10^{-4}$ cm. radius with the largest number, in the range of $10^{-7}$ to $10^{-6}$ cm. radius.

Furthermore, it has been observed that these particles of contact material act as condensation nuclei and thus provide a very powerful tool for measuring the amount of erosion of the contact elements. Condensation nuclei is a generic name given to small airborne particles which are characterized by the fact that they serve as the nucleus on which water, for example, will condense to produce a cloud of droplets. Such condensation nuclei encompass microscopic and submicroscopic particles, the most important segment of the size spectrum lying in a size range extending from approximately $2.5 \times 10^{-7}$ cm. radius to $1 \times 10^{-5}$ cm. radius.

By utilizing condensation nuclei measuring techniques, an arc erosion measuring apparatus and method of a very high order of sensitivity may be achieved since there are available nuclei measuring instruments having sensitivities of one part in $10^{-14}$ by weight. Thus, condensation nuclei measuring techniques present a very powerful tool for rapidly and accurately evaluating and comparing the erosion characteristics of many different types of contact elements.

It is an object of this invention, therefore, to provide a method and apparatus for rapidly and accurately measuring the effects of arcing on electrical contacts.

A further object of this invention is to provide a method and apparatus for measuring electrical contacts erosion by utilizing condensation nuclei measuring techniques.

Another object of this invention is to provide a method and apparatus which permits rapid and accurate evaluation of the arcing effects of various contact parameters.

Further objects and advantages will become apparent as the description of this invention proceeds.

In accordance with the invention, there is provided a chamber which is maintained substantially free of ambient condensation nuclei and which is adapted to hold electrical contact elements. Electrical circuit means are provided for operating the contact elements at various rates and under diverse load conditions. The number of arc produced condensation nuclei present are measured in a condensation nuclei meter to provide an indication of the relative amount of erosion. That is, by measuring the quantity of condensation nuclei produced for different contact parameters it is possible to determine the value of these parameters which causes the minimum condensation nuclei production and consequently the minimum erosive effect. Thus a very valuable tool in rapidly and accurately determining arc produced erosion effects is provided.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawing in which:

Figure 1 shows a view partially in cross sections of the novel apparatus of the invention.

Figure 2 is a sectional view of a portion of the test chamber taken along the lines 2—2 of Figure 1.

Figure 3 is an enlarged view of a portion of Figure 1.

Figure 4:
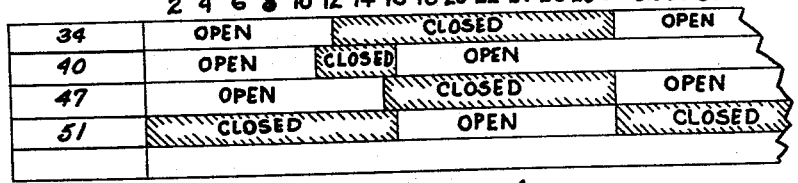
Figure 4 is a diagram illustrating the relative positions of the valves of the condensation nuclei meter during different portions of the operating cycle.

Referring now to Figure 1, there is shown a preferred embodiment of a condensation nuclei arc erosion measuring instrument illustrating the principles of the instant invention. There is provided a chamber means 1 adapted to hold an electrical contact element whose arc erosion characteristics are to be determined. The chamber 1 is of rectangular configuration, although any other suitable configuration may be utilized, and is maintained substantially free of ambient condensation nuclei. The bottom wall of the chamber 1 is constituted of a perforated plate element 2, most clearly seen with reference to Figure 2, which permits the flow of nuclei-free air into the chamber 1. The manner in which the air is supplied to the chamber as well as its purpose will be described in greater detail later. An apertured upper wall member 3 provides communication between the chamber 1 and a mixing and integrating chamber 17.

A sealing valve 4 is provided in the apertured upper wall between chamber 1 and chamber 17 to control communication between the chambers. The sealing valve 4 consists of a circular internally threaded closure member 5 having an O-shaped sealing ring 6 positioned thereon. A threaded member 8 extending through said closure member engages an internally threaded fixed bracket 7 within the integrating chamber 17. A wing nut element threaded on the element 8 upon rotation urges the closure member 5 and the O-ring 6 into a closed position against the upper apertured wall 3 to interrupt communication between the test chamber 1 and the integrating chamber 17. In this fashion the chamber 1 may be operated as a sealed chamber, or with the valve 4 open permits flow of air from the chamber 1 into the integrating 17. Such alternative operation, as will be explained later in greater detail with reference to the manner of operation of the instant apparatus, is necessary because of the nuclei producing characteristics of different types of arcs.

Positioned within the chamber 1 are electrical contact members whose arc induced erosion characteristics are to be determined. A mounting fixture 19 which is constructed to permit the mounting of many different contact elements for the purposes of testing is positioned within chamber 1. Fastened to the fixture 19 is a solenoid coil 20 which functions to operate a pair of contact elements 21 which are being tested. Permanently attached to a panel member mounted within the chamber 1 are output terminals for external circuitry for controlling the operation of the solenoid 20 and the contact elements 21 as well as terminals for connecting permanent load circuit to the contacts.

Electrical circuit means 24, external to the chamber, are provided for operating the contact elements at various rates and under diverse load conditions including cycling means for varying the rate of contact operation. Connected to the solenoid element 20 is a cycling means 25 which, for the sake of simplicity, is shown in block diagram form. The cycling means functions to energize the solenoid 20 periodically in order to operate the contact elements 21. The cycling means may be constituted of a cam member operating microswitches to energize the solenoid 20 periodically. It may sometimes be desirable to utilize varying cycling rates in which case a more sophisticated timer circuit may be utilized. Such timing circuits are, of course, old and well-known in the art and may be easily constructed depending on the type of timing desired.

The output terminals of the contact elements 21 are connected to a load 23. The load 23, for the sake of simplicity, is shown in block diagram form but it is to be understood that many different types of load circuits may be utilized. That is, it may be desirable to determine the relationship of contact erosion to the type of load utilized; i.e., whether inductive or non-inductive, in which case loads having the different desired characteristics may be utilized.

In addition, there is provided a means to free the test chamber 1 of all ambient condensation nuclei as well as diluting the air in the chamber to control the level of arc produced condensation nuclei. To this end there is provided a source of filtered air, which when desirable, is permitted to flow past the contact elements. Positioned adjacent to the perforated lower wall of the chamber 1 is a fine filter element 9 which may be constituted of glass wool, or other similar fibrous material, and which eliminates all condensation nuclei from air passing therethrough and into the chamber 1.

A source of prefiltered air having an adjustable rate of flow is provided for passage through the filter 9. For this purpose there is provided a conduit 11 connected to a source of air, not shown, which has positioned therein a coarse filter element 12 for removing a portion of the ambient condensation nuclei. The coarse filter 12, in a manner similar to filter 9, may be fashioned out of glass wool fibre or other similar material. Also positioned within the conduit 11 is a flow valve 13, illustrated in block diagram form, of suitable construction to control the flow of air through the conduit. The conduit 11 is connected to a blower 14, of well-known construction, which provides in conjunction with the flow valve 13 and a motor 15 a stream of air having an adjustable rate of flow. The blower produced stream of air is directed through a lower chamber 10 positioned adjacent to the filter element 9 and into the chamber 1.

Positioned within the chamber 10 is an air flow measuring element 16 which may be of any well-known type. The air flow measuring device 16 provides an indication of the rate of flow of the air into the chamber 1.

The filtered air supply means 11 is also adapted to be shut off whenever the chamber 1 is operated as a sealed chamber by shutting off the motor 15 or by closing the flow valve 13.

There is provided a sampling means 26 which permits the selective sampling of the arc produced nuclei containing air in either chamber 1 or integrating chamber 17. The sampling means consists of a first conduit element 27 extending into the chamber 1 and a second conduit element 28 extending into the integrating chamber 17. The conduits 27 and 28 are connected to a two-position transfer valve 29 which functions to permit passage of air therethrough either from conduit 27 or 28.

The rotary transfer valve 29, which can be seen most clearly with reference to Figure 3, consists of a valve body having a cylindrical bored portion therein. The input conduits 27 and 28 extend through the valve body into the bore and are positioned at an angle of 180° relative to each other. An output conduit 30 similarly extends through the valve body into the bore and is positioned intermediate to conduit elements 27 and 28. The cylindrical bore of the valve body contains a rotary member having a recessed portion which aligns the output conduit 30 either with the conduit 27 or the conduit 28. Depending on the relative position of the rotor member, air in either chamber 1 or chamber 17 will be permitted to pass through the valve into the output conduit 30. That is, if the chamber 1 is operated as a sealed chamber, the valve element 29 is positioned so that the conduit elements 27 and 30 are in alignment to permit passage therethrough of air samples from within the chamber 1. With the sealing valve 4 in the open position, the valve element 29 is positioned so as to bring the conduits 28 and 30 into alignment to permit air samples from the integrating chamber 17. In this fashion the air in the chambers 1 and 17 may be selectively sampled.

Coupled to the output of the sampling means is an apparatus which provides a means to measure the number of condensation nuclei produced by the arcing to provide an index of the erosion and wear of the contact elements. The condensation nuclei measuring apparatus illustrated broadly as 32 measures the number of arc-produced condensation nuclei by relying on their property of acting as the nucleus of a water drop. Broadly speaking, the air samples containing the condensation nuclei are brought to 100% relative humidity by means of a humidifying device. The humidified air samples are introduced into an expansion chamber by a valving arrangement and the humidified air is periodically expanded to cause a supersaturated condition which causes the formation of small water droplets. These small water droplets attenuate a beam of light to produce an electrical signal which is a measure of the number of condensation nuclei.

The apparatus for measuring the condensation nuclei illustrated in Figure 1 is disclosed and claimed in Patent No. 2,791,901 granted to Theodore A. Rich on May 14, 1957, entitled "Method and Apparatus for Measuring Condensation Nuclei." The valve output conduit 30 is connected to a humidifying element 33 which functions to bring the nuclei containing air samples to 100% humidity. Connected to the output of the humidifier 33 is an elongated sampling chamber 35 adapted to hold the humidified air samples under pressure. A solenoid valve element 34 between the humidifier 33 and the sample chamber 35 controls the flow of humidified air into the chamber 35.

Mounted adjacent one end of the chamber 35 is a source of radiant energy 36, such as an incandescent lamp or the like, which produces a beam of radiant energy to traverse the chamber. Positioned adjacent the other end of the chamber is a radiation sensitive means 37, such as a cadmium selenide cell to intercept the beam of radiant energy and produce an electrical signal in response thereto. The magnitude of the electrical signal will be proportional to the amount of attenuation the beam of radiant energy caused by water droplets forming about condensation nuclei. Thus the magnitude of the output signal is a direct measure of the number of condensation nuclei. The output of the cell 37 is connected to a measuring instrument 38, such as a meter, to provide an indication of the magnitude of the electrical signal and, consequently, of the number of nuclei. The meter 38 may be calibrated directly in number of nuclei per cubic centimeter to provide a direct indication. Alternatively, the output from the cell 37 may be connected to a continuous recording instrument.

An expansion chamber 41 to provide for the periodic expansion of the air samples is connected to the sample chamber 35 through a conduit 39 and a solenoid valve 40. The expansion chamber 41 comprises two chamber portions 42 and 43 whose relative volumes may be varied by means of a movable piston element 45 positioned within the chamber 41. The chamber portions 42 and 43 are connected by means of a restricted passageway 44 extending through the piston 45 to provide a slow flow of air between these chamber portions.

There is provided a source of lower pressure to permit the periodic expansion of the air in the chamber 35. To this end a vacuum pump 49 is provided which is connected to the chamber 41 by means of a conduit 46, a solenoid valve 47 and a second conduit 48. Thus, the air samples are subjected to periodic pressure defined expansions causing condensation of moisture about the nuclei and forming a cloud of droplets within the sample chamber 35 to produce an electrical signal as an index of the number of nuclei. In addition a by-pass conduit 50 including a solenoid valve 51 is provided between the vacuum pump element 49 and the humidifier conduit 30.

The functioning of the condensation nuclei meter of Figure 1 can be described by the following sequence of operations. The sample to be tested enters into the humidifier 33 where it is brought to 100% relative humidity and to the temperature of the sample chamber 35. This occurs during a portion of the operational cycle which may be denominated as the Flush portion. At this time, as may be seen most clearly with reference to Figure 4, the solenoid valves 40, 34 and 47 are open so that the vacuum pump 49 draws air completely through the system in order to remove the previous sample as well as to bring the new sample into the sample chamber. The next portion of the cycle, known as the Fill portion, sees the valve 40 close, stopping flow out of the sample chamber 35. The valve 34, however, is still open so that air continues to flow into chamber 35 until inlet pressure is reached.

The next portion of the cycle, usually denominated as the Dwell portion, then occurs. During this portion the air sample in the chamber 35 is permitted to reach and equilibrium condition while the expansion chambers 42 and 43 have their pressures reduced to provide the proper expansion. That is, valve 34 closes while the valve 40 remains closed. In this fashion the sample in the chamber 35 reaches equilibrium conditions. The valve 47 remains open during this period and the vacuum pump 49 reduces the pressure in the chamber portions 42 and 43 to a predetermined value below that found in the chamber 35.

The next and final portion of the cycle is the Expand portion during which the air sample is permitted to undergo a volume-defined expansion in order to form a cloud of droplets about the condensation nuclei present in the sample. Prior to the start of the Expand portion the valve 47 closes and the valve 51 opens, by-passing the instrument. Very shortly after the valve 47 has closed, valve 40 opens, allowing the air sample in the chamber 35 to expand into the chamber 42. The pressure in the chamber 35 falls very rapidly since the air sample in the chamber must now occupy both chambers 35 and 42. This sudden expansion of the air sample in the chamber 35 cools the air in the chambers. The amount of water vapor in the air which was 100% of what could be retained at the former temperature will now be more than 100% of what can be retained at the cooler temperature. Thus, a condition of supersaturation exists instantaneously within the chambers. The degree of supersaturation, and consequently the minimum size of nuclei detectable, is determined by the size of the chamber 42. Vapor begins to condense about all nuclei that are bigger than a critical size, the critical size being determined, as was pointed out, by the degree of supersaturation achieved. As these drops start to grow they, of course, leave less water vapor available and the supersaturation falls rapidly. Then the additional expansion due to chamber 43 comes into play and makes more water vapor available by continued expansion through the restricted passage 44 in the piston element 45. The rate at which the further expansion into chamber 42 occurs is so controlled that the supersaturation never exceeds that obtained in the first instant by the expansion into chamber 42. Thus a cloud of water droplets is formed within the sampling chamber 35, which attenuates the beam of radiant energy from the incandescent light source 36, causing a reduction in the reading of the meter 38 connected to the cell 37. This reduction in the reading then provides a measure of the number of condensation nuclei present.

The cycle of operation may then be repeated and a new air sample drawn into the chamber. In the preferred embodiment illustrated in Figure 1 the cycle of operation of the condensation nuclei instrument 32 goes through a complete cycle in one-half minute. Figure 4 gives a graphical illustration of the operational cycle of the solenoid valves 34, 40, 47 and 51 for one such cycle. That is, the valve positions are plotted along the ordinate whereas time is plotted along the abscissa. It is obvious, of course, that timing cycles other than one-half minute may be utilized with the condensation nuclei measuring device.

The solenoid valves are operated in the desired sequence by means of a timing circuit which, for the sake of simplicity, is not shown. Although solenoid valves are shown as controlling the operation of the meter, it is clear that manually operated valves may be substituted therefore without going outside of the spirit of the invention.

By moving the position of the piston element 44 within the chamber 40 it is possible to control the range of particle sizes detected by the measuring device. This is clear since, as has been pointed out previously, the degree of supersaturation may be controlled in this manner which will in turn control the range of sizes of nuclei to be detected. It should be understood, however, that condensation nuclei measuring devices other than the one shown in Figure 1 can be utilized to measure the arc-produced nuclei. For example, a condensation nuclei meter of the type disclosed in Patent Number 2,684,008 issued July 20, 1954, to Bernard Vonnegut may be utilized in place of the apparatus shown to give continuous indications.

Furthermore, the so-called Nolan-Pollak Counter, a description of which may be found in the Proceedings of the Royal Irish Academy, vol. 51, SECA, may be used with equal facility in the apparatus of Figure 1, by appropriate modification of the air handling.

The operation of the apparatus of Figure 1 may be described as follows. Electrical contact elements of a given configuration and having given structural parameters are positioned within the chamber 1 and mounted on the mounting fixture 19. The chamber 1 is freed of substantially all ambient condensation nuclei by blowing filtered air through it. In this manner any indication of the condensation nuclei on the meter 32 will be due exclusively to those nuclei produced by arcing of the contact elements 21. If the chamber 1 is to be operated as a sealed chamber, the sealing valve 4 is closed by manipulating the wing nut mounted on the threaded member 8. Simultaneously the transfer valve means 29 is operated to bring the conduits 27 and 30 into alignment so that the air within the chamber 1 is sampled. The blower 14 is then switched off since with the chamber 1 operating as a sealed volume no dilution of condensation nuclei level is desired. The cycling means 24 for the contact elements 21 is actuated in order to produce periodic arcing between the contacts 21 upon the making or interrupting of a current through the load circuit 23 for a suitable length of time. The condensation nuclei measuring instrument 32 in conjunction with the sampling means 26 measures the condensation nuclei level within the chamber 1 to provide an indication of the degree of arcing by measuring the relative amounts of condensation nuclei produced thereby.

The condensation nuclei levels for one set of structural parameters having been determined by a number of samplings, the parameters may now be varied and the relative condensation nuclei count again observed. That is, parameters such as cycling rates, contact tip composition, contact configuration, contact mass, contact spring gradient, may be varied and the relative nuclei levels may be noted in order to determine the effect of the parameter changes on arcing erosion. In this fashion, it is possible, in a very rapid and accurate manner, to determine the relative effects of these various contact parameters.

As has been pointed out previously, this apparatus may be operated with the chamber 1 operating as a sealed volume, or with the chamber 1 in communication with a mixing and integrating chamber 17. The particular manner in which the apparatus will be operated depends on the nature of the electric arc to be evaluated.

That is, with a very heavy arc being formed by the contact elements 21 a very high level of nuclei concentration, on the order of $10^7$ condensation nuclei per cc. exists. The best operating range for a condensation nuclei meter, of the type illustrated in Figure 1, is between 200 and 100,000 nuclei per cc. Therefore, in order to take advantage of the highest sensitivity range of the instrument it may be desirable to dilute the air samples containing the condensation nuclei. Therefore it becomes necessary to provide a stream of filtered air which may be directed past the contact elements 21 in which, in conjunction with the integrating chamber 17, dilutes the condensation nuclei level. In addition, the integrating and mixing chamber 17 serves the function of averaging out statistical fluctuations for a number of contact operations. Also, the presence of a flow of filtered air past the contact elements serves the additional purpose of increasing the total nuclei count and, consequently, providing greater accuracy by preventing, to a certain extent, the recombination of the vaporized contact material. The condensation nuclei measuring instrument now operates twice a minute and the operation is continued long enough to get reproducible indications of the instrument 32.

On the other hand, if it is desired to determine contact operating conditions where small barely visible arcs are produced, the nuclei levels produced by the arcing are fairly low and it would be undesirable to further dilute these. In such a case the chamber should be operated as a sealed volume by closing the sealing valve 4 and turning off the blower element 14.

In order to establish the validity of this method of determining arc-induced contact erosion, several experiments were run which demonstrate the relationship between the condensation nuclei count and the effects of the air velocity blowing past the contacts. Further tests were run which established a relationship between the nuclei count produced by two different types of contact materials. In this fashion it is possible to demonstrate clearly the wide applicability of this measuring technique.

Figure 5:
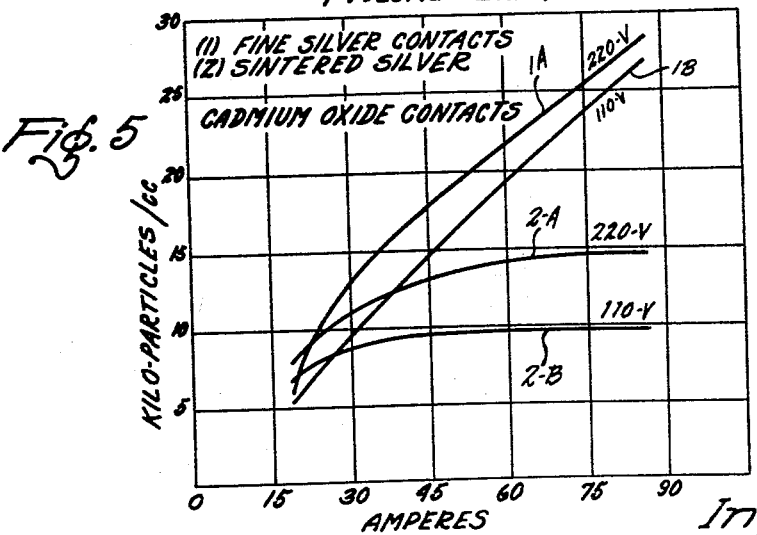
Figure 5 is a graph illustrating the nuclei productivity of two different contact tip materials.

Figure 5 shows a graph illustrating the nuclei productivity of two different contact tip materials. The contact elements represented by the curves denominated 1A and 1B were constituted of fine silver, while the contact elements represented by curves 2A and 2B were constituted of sintered silver-cadmium oxide.

The abscissa of Figure 5 is plotted in amperes of load current drawn through said contact elements and the ordinate is plotted in condensation nuclei kiloparticles per cc. Curve 1A indicates the nuclei production for a 220 volt load whereas curve 1B shows the distribution for a 110 volt load. In similar fashion curves 2A and 2B illustrate the relationship for 220 volts and 110 volts respectively. From an examination of the curves of Figure 5, it can be seen that the nuclei count increases for increasing voltage and amperage loads. Thus curves 1A and 1B as well as 2A and 2B indicate that for the same type of contact material a higher condensation nuclei count will be observed for a higher voltage load. Curves 1A and 1B when compared to curves 2A and 2B illustrate further that at high current loads fine silver contacts produce a much higher level of condensation nuclei than do contacts constituted of sintered silver-cadmium oxide, thus indicating that at high currents there is a much higher arc erosion in contacts made of fine silver. The curves further indicate that at low currents, those below 30 amperes, fine silver contacts produce less condensation nuclei, and thus less arcing erosion than do contact elements constituted of sintered silver-cadmium oxide. Thus it can be seen that this method and apparatus provides a clear-cut indication of the effects of contact material on nuclei production and consequently on arc-produced erosion.

Figure 6:
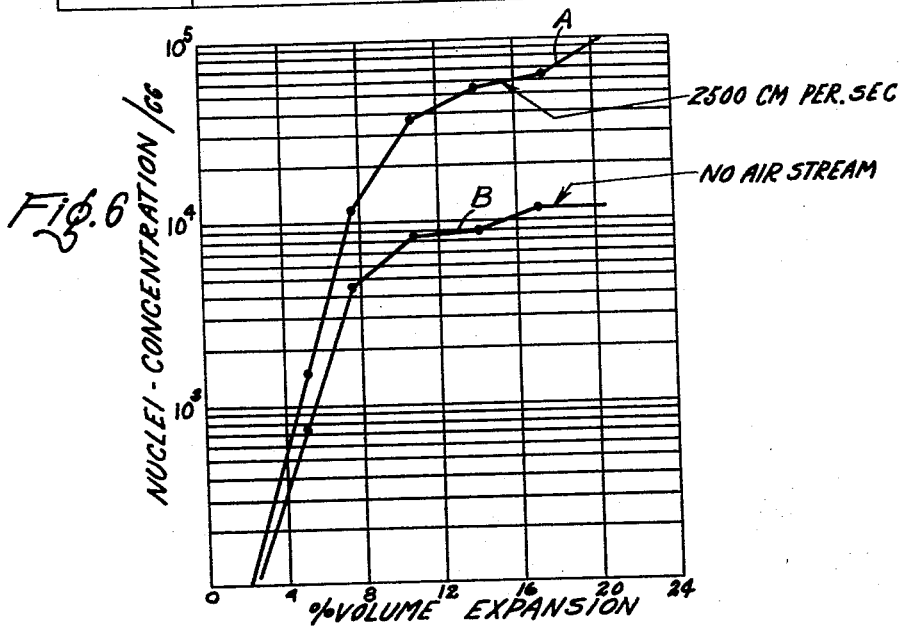
Figure 6 is a graph illustrating the effects on nuclei production of an air stream blown past the contact members.

Figure 6 illustrates the relationship between the amount of nuclei produced and the velocity of the filtered air stream passing by the contact elements 21. The ordinate of Figure 6 is plotted in condensation nuclei kiloparticles per cc. while the abscissa is plotted in percent of expansion necessary to produce water droplets within the condensation nuclei meter. Curve A shows the relationship between the nuclei count and the degree of expansion for a condition where a filtered air stream having a velocity of 2500 cc. per minute is allowed to pass past the contact elements, whereas the curve B illustrates the condensation nuclei level produced when no air stream is present. The curves of Figure 6 clearly illustrate the effect of quickly clearing the contact area of the nuclei before they have an opportunity to recombine and be trapped. It can be seen that the nuclei count is greatly increased by separating the particles and removing them from the region of the contact surfaces. Consequently, the utilization of such a filtered air stream makes possible, in certain cases, to achieve a much more accurate indication of the number of nuclei produced and consequently of the amount of erosion induced by the arcing.

This method is primarily a comparative one. Any adjustment of a given relay, for example, that reduces the nuclei produced will increase the life of the relay. The relation between life and the reciprocal of nuclei production is not necessarily linear.

From the foregoing description, it can be appreciated that this invention provides a method and apparatus for determining quickly and accurately the contact erosion and contact wear produced by arcing of electrical contact elements. Furthermore, the instant apparatus and method provides an easy and accurate approach to measuring the effect of various parameters on contact erosion.

While a particular embodiment of this invention has been shown it will, of course, be understood that it is not limited thereto since many modifications both in the circuit arrangement and in the instrumentalities employed may be made. It is contemplated by the appended claims to cover any such modifications as fall within the true spirit and scope of this invention.

What I desire to secure by Letters Patent of the United States is:

1. In an apparatus for determining the erosion effects on electrical contact elements produced by arcing between the elements during operation, the combination comprising a chamber means maintained substantially free of ambient condensation nuclei and adapted to hold arc producing electrical contact elements, means to control the nuclei concentration levels produced by operation of said electrical contact elements in said chamber means including means to direct a flow of filtered air through said chamber means, means to vary the velocity of the filtered air flowing through said chamber for controlling the degree of dilution of the nuclei level within said chamber means, and means to measure the number of condensation nuclei as an index of contact erosion due to said arcing.

2. In an apparatus for determining the erosion effects on electrical contact elements of arching produced in the course of operation of said contact elements, the combination comprising a chamber means adapted to hold electrical contact elements which produce nuclei upon operation and maintained substantially free of ambient condensation nuclei, means to dilute the air in said chamber whereby the level of discharge-produced condensation nuclei may be controlled including a source of filtered air, means to direct said filtered air through said chamber at different velocities to control the degree of dilution and the nuclei level within said chamber, and means communicating with said chamber to sample the chamber air containing said nuclei, and means to measure the number of nuclei as an index of contact erosion due to said arcing.

3. In an apparatus for determining the erosion effects on electrical contact elements of arcing produced in the course of operation of said contact elements, the combination comprising a first chamber means adapted to hold electrical contact elements that arc upon being operated producing condensation nuclei and maintained substantially free of ambient condensation nuclei, a source of nuclei-free air to be passed through said first chamber, a second chamber means communicating with said first chamber whereby in conjunction with said nuclei-free air the condensation nuclei level due to arcing between said contact elements may be controlled, means to sample selectively the nuclei containing chamber air in said first and second chambers, and means to measure the number of nuclei as an index of contact erosion due to said arcing.

4. In an apparatus for determining the erosion effects of electrical arcs formed between electrical contact elements during operation of said elements, the combination comprising a first chamber means adapted to hold electrical contact elements that arc when operated producing condensation nuclei and maintained substantially free of ambient condensation nuclei, a source of nuclei-free air to be passed through said first chamber, a second chamber means communicating with said first chamber means, valve means between said first and second chambers adapted to isolate said chambers, said source of nuclei-free air including a blower means and a filter means to remove substantially all naturally occurring ambient nuclei, means communicating with said chambers to sample selectively the nuclei containing chamber air in said first and second chambers, and means to measure the number of nuclei as an index of contact erosion due to the arcing between said contact elements.

5. In an apparatus for determining the erosion effects on electrical contact elements due to arcing between said contact elements, the combination comprising a first chamber means adapated to hold electrical contact elements that arc when operated producing condensation nuclei and maintained substantially free of ambient condensation nuclei, second chamber means communicating with said first chamber means, valve means between said first and second chambers adapted to control communication therebetween, a source of nuclei-free air passing through said first and second chambers to control the nuclei level, means to sample selectively the nuclei containing chamber air in said first and second chambers including a first conduit extending into said first chamber, a second conduit extending into said second chamber, valve means adapted to connect said first and second conduits selectively to an output conduit, means connected to said output conduit to measure the number of nuclei as an index of contact erosion due to arcing between said contact elements.

References Cited in the file of this patent

UNITED STATES PATENTS

| | | |
|---|---|---|
| 1,971,215 | Feussner | Aug. 21, 1934 |
| 2,439,806 | Heineman | Apr. 20, 1948 |
| 2,684,008 | Vonnegut | July 20, 1954 |
| 2,828,432 | Rich | Mar. 25, 1958 |

FOREIGN PATENTS

| | | |
|---|---|---|
| 1,113,584 | France | Dec. 5, 1955 |